United States Patent

[11] 3,632,155

| [72] | Inventor | Marvin L. Parker<br>11725 Strathmore Avenue, Detroit, Mich. 48227 |
|---|---|---|
| [21] | Appl. No. | 889,363 |
| [22] | Filed | Dec. 31, 1969 |
| [45] | Patented | Jan. 4, 1972 |

[54] AUTOMOBILE WITH ROBBERY PREVENTION PARTITION
12 Claims, 8 Drawing Figs.

[52] U.S. Cl. .................................................. 296/24
[51] Int. Cl. .................................................. B60r 27/00
[50] Field of Search .......................................... 296/24; 280/150, 150 B

[56] References Cited
UNITED STATES PATENTS

| 2,566,032 | 8/1951 | Poland | 296/24 |
| 3,002,784 | 10/1961 | Bagg | 296/24 |
| 3,397,005 | 8/1968 | May et al. | 296/24 |
| 3,469,090 | 9/1969 | Redus | 296/24 |
| 3,510,164 | 5/1970 | Setina | 296/24 |

*Primary Examiner*—Leo Friaglia
*Assistant Examiner*—Robert R. Song
*Attorney*—Burns, Doane, Benedict, Swecker & Mathis ABSTRACT: A robbery prevention shield located between the front and rear seats of an automobile and bridging the space between the floor, roof and opposite door posts of the automobile. The shield includes an upright unitary wall of bullet resistant material which has flange portions at at least some of the peripheral edges thereof and is secured to the front seat of the automobile for adjustment therewith. The shield has a sliding door with an opening for passage of money.

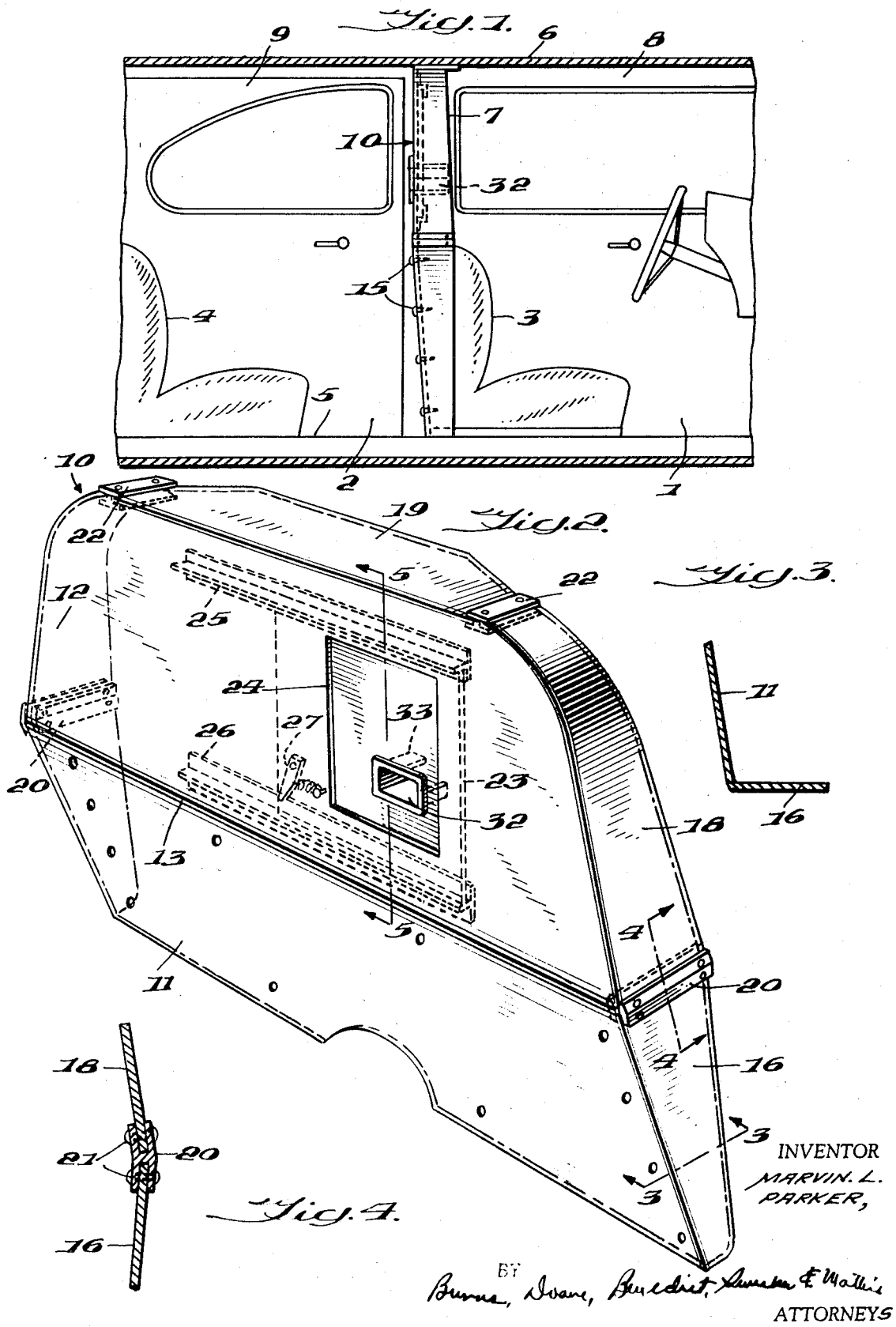

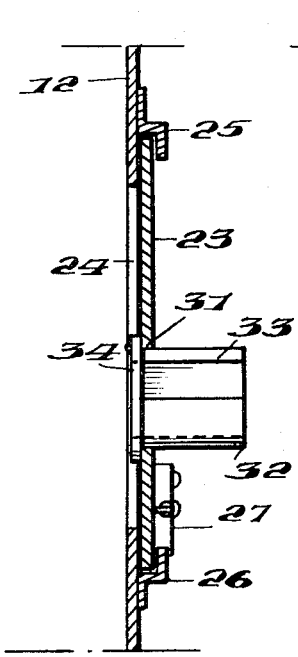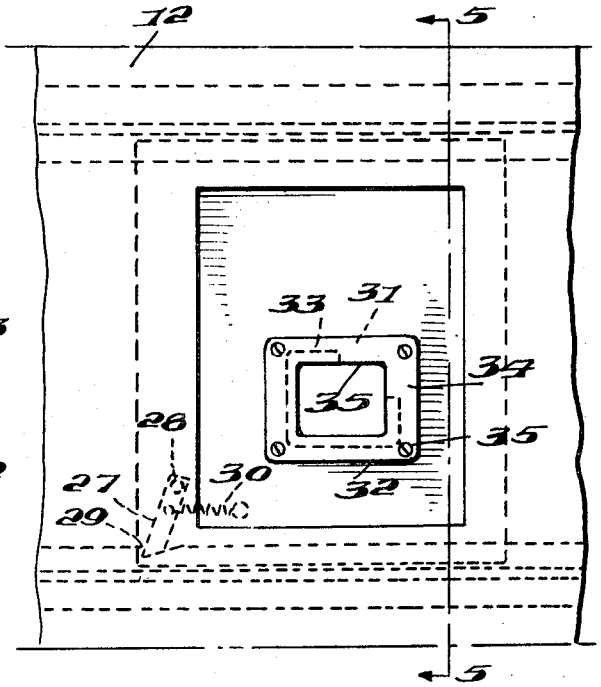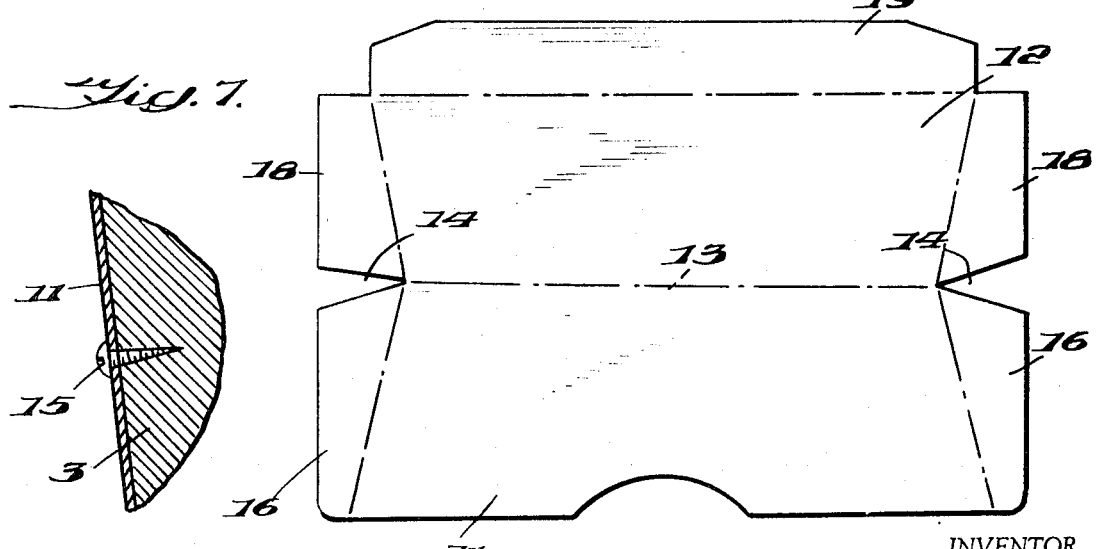

AUTOMOBILE WITH ROBBERY PREVENTION PARTITION

SUMMARY OF THE INVENTION

This invention relates to improvements in automobiles, with robbery prevention partitions extending between the front and rear seats of the automobile, to be used particularly in such vehicles as taxicabs where robberies of the drivers are frequent.

Suggestions have been made heretofore to provide partitions in automobiles, but these have been subject to one or more objections. Frequently, they have been complex in structure, difficult to install, insecure in use for failure to protect the driver effectively and have often been unsightly and impractical.

One object of this invention is to overcome these objections to robbery preventing partitions and to improve the construction thereof for installation in automobiles.

Another object of the invention is to simplify and improve partitions for this purpose to enable these to be installed easily and inexpensively without detracting from the aesthetic effect of the automobile or the ability of the driver to obtain proper comfort in his seated position.

Still another object of the invention is to shield the entire area between the floor and roof and the opposite side posts of the automobile with bullet resistant material by a unitary wall which is secured in place at the peripheral edges thereof and which is so formed at said peripheral edges that a weapon may not be forced over or around the partition.

A further object of the invention is to provide for access through the shield, both for communication and for the passage of money, or either of them.

These objects may be accomplished according to one embodiment of the invention by providing a unitary wall of bullet resistant material extending substantially throughout the height of the interior of the automobile and shaped to conform to the floor and roof thereof and extending continuously between the opposite door posts. At the peripheral edges of the wall, flanges serve not only to embrace the automobile front seat, but also to stiffen the wall against a weapon being forced over or around the peripheral edges thereof.

Access through the shield may be provided by a suitable door, such as a sliding door, if desired. A money changer may be provided in the shield, as for example, in the sliding door, to allow for the passage of money therethrough.

BRIEF DESCRIPTION OF DRAWINGS

This embodiment is illustrated in the accompanying drawings, in which:

FIG. 1 is a longitudinal sectional view through a portion of an automobile, showing the invention applied thereto;

FIG. 2 is a perspective view of the shield detached;

FIG. 3 is a detail horizontal section on the line 3—3 in FIG. 2;

FIG. 4 is a similar view on the line 4—4 in FIG. 2;

FIG. 5 is a vertical cross section through the sliding window;

FIG. 6 is a partial side elevation thereof;

FIG. 7 is a detail section; and

FIG. 8 is a plan view of the shield blank.

DETAILED DESCRIPTION OF DISCLOSURE

The automobile generally illustrated in FIG. 1 may be of the type which serves as a private vehicle or as a taxicab. In either event, it is of the two-seat type and, especially when it serves as a taxicab, the front seat is intended for the driver while the back seat is for passengers.

In the illustrated embodiment, the driver's compartment is designated generally by the numeral 1 and the passenger's compartment is designated at 2, with the front and rear seats being indicated at 3 and 4, respectively. The vehicle body usually has a floor 5 and a roof 6, with upright door posts 7 extending from the floor to the roof, forming jambs for the front doors 8 and hinge supports for the rear doors 9.

The automobile is provided with an upright partition or robbery prevention shield, generally indicated at 10, between the compartments 1 and 2 and at the back of the front seat 3. This shield 10 is shaped to conform to the interior contour of the compartment 2 behind the front seat 3, bridging the space between the floor and roof and between the opposite side posts 7.

In the form shown, the shield 10 has an upright unitary wall, portions of which are indicated at 11 and 12 preferably formed of one integral piece of bullet resistant material. These portions 11 and 12 are bent somewhat out of alignment with each other along the longitudinal midportion of the shield, as indicated at 13 in FIG. 2.

This sheet of bullet resistant material is initially flat and is cut out and shaped as shown in FIG. 8. This sheet is notched out at opposite ends, as indicated at 14.

The lower portion 11 has forwardly turned flanges 16, extending forwardly of the automobile around the opposite ends of the front seat 3. The flanges 16 are formed in one integral piece with the sheet portion 11.

The sheet portion 12 is also provided with forwardly extending flanges 18 at opposite ends thereof secured in one integral piece to the lateral edges thereof. A flange 19 extends horizontally along the top edge of the sheet 12 to conform to the undersurface of the roof. This flange 19 is formed in one piece with the sheet portion 12, and folded forward along the underside of the roof 6.

The flanges 16 and 18 are preferably connected together at each opposite end of the partition by channel-shaped connectors 20, having channels in opposite edges thereof, as shown in FIG. 4, receiving the adjacent edges of these flanges and preferably secured thereto in a suitable manner as, for example, by fastenings, such as rivets 21. In like manner, the flanges 18 and 19 are connected together at their adjacent ends by connectors 22, which are also grooved at their opposite edges to receive therein the edge portions of the flanges 18 and 19.

The shield may be made in one integral piece of bullet resistant material, and the packing and shipping of the shield is thereby facilitated. The parts can be easily assembly and installed as a shield in a taxicab or other vehicle. The shield should be secured to the back of the front seat 3 of the body, with the flanges 16, 18 and 19 extending in embracing relation with the front seat. The shield is so formed to cover the entire area from the floor 5 to the roof 6 and between the side posts 7. It is secured to the front seat by the screws 15, thereby allowing freedom of sliding movement of the front seat. This serves not only as a secure mounting for the shield, but it also prevents a weapon from being forced over or around the partition.

A door may be used, if desired, for access through the shield between the front and rear compartments 1 and 2. In the form of the invention illustrated in the drawings, this door is shown as of the sliding type, indicated at 23, over an opening 24 in the portion 12 of the wall. The door 23 may comprise a plate of flat bullet resistant material of substantially the same material as the shield itself and be disposed in flat relation against the forward face of the portion 12.

The upper and lower edges of the door 23 are mounted in tracks 25 and 26 provided with channels therein to receive the edges of the flat door and to guide the latter lengthwise of the portion 12 and keeping it tight against the fact of this shield portion. The channels may be provided with stops at opposite ends thereof to limit the sliding movement of the door.

Provision is made also for locking the door in closed position. While any suitable form of locking means may be used for the purpose, such as a toggle bolt, wedge or the like, I have illustrated a lock 27 pivoted at 28 on the door 23, with an end position to engage in a stop 29 when the door is in closed position and thereby to hold and lock the door closed. A spring 30 is connected with the lock 27 and is tensioned to keep the latter in locking position when the door is moved to this closed position for automatically engaging the stop notch 29.

The shield may be provided also, if desired, with means for handing money back and forth between the compartments. In this embodiment an opening for this purpose is formed in the door 23, although it may be located in the portion 12 if preferred. This opening is shown in FIGS. 5 and 6 and is indicated at 31. Mounted in the opening 31 is a tray 32 which extends through the portion 12 of the shield and into the compartment 1. This tray 32 is illustrated as having a flat bottom with upturned opposite sides permanently secured to the door 23. One of the sides which is located on the side of the driver continues up to the top of the opening 31 and is turned back toward the center of the opening to form an overhanging flange, indicated in FIG. 6 at 33. This side and flange would prevent a person in the rear compartment from pointing a gun at the driver through the opening.

A mounting plate 34 is located on one side of the door 23, with a hole 35 therein registering substantially with the inner contours of the tray 32 and flange 33. This mounting plate 34 is secured by a plurality of fastening bolts 35 to the door 23 as a protection for the money changer channel or tray and as added support therefor. The end of the tray is adhesively or otherwise secured to the inner face of the plate 34. The driver may have access through the opening 35 and the tray 32 to receive payment or to make change. This forms a simple and inexpensive money changer attachment that may be used if desired.

This partition is of unitary construction that may be easily and readily mounted in the vehicle and may be interchangeable to different models. It requires no frame or movable parts. It leaves the driver completely enclosed and free of holdups inasmuch as there is no provision for access to the driver, either through an opening in the partition or over or around the partition. It is inexpensive to build and to install and may be applied as an accessory by cab companies or owners of automobiles.

While the shield 10 is mounted in the automobile body between the door posts 7, it is secured to the front seat 3. The flanges 16, 18 and 19 form an open shell around the front seat 3 which can be adjusted forward and back or otherwise therewith to accommodate the driver.

The flanges around the wall forming the shield also serve to prevent the hand from reaching around the edges, as well as taking care of variations in seat adjustment. Seats vary in position, but the shield can be properly located in position on the seat before drilling the holes for mounting the shield during installation.

While the invention has been illustrated and described in one embodiment, it is recognized that variations and changes may be made therein without departing from the invention as set forth in the claims.

I claim:

1. In an automobile having a body with a front driver's seat, a rear passenger seat, a floor and roof extending between said seats, and side door posts connecting said floor and roof and located between said seats, the combination therewith, of a robbery prevention shield, said shield including a unitary wall of bullet resistant material extending continuously from the floor to the roof and continuously between the door posts, and means for securing said wall to the driver's seat, said wall having substantially continuous flanges around the top end and opposite side ends extending forwardly thereof embracing opposite lateral ends of the driver's seat between the latter and the side door posts in close proximity to the latter and movable relative thereto upon movement of the driver's seat.

2. In an automobile according to claim 1, said wall including a sheet extending throughout the width of the body and being of relatively thin bullet resistant material.

3. In an automobile according to claim 1, said wall comprising a sheet of bullet resistant material extending over the area between the floor and roof and between the door posts, said flanges comprising flange sections extending forwardly of the body along a plurality of the lateral edges thereof.

4. In an automobile according to claim 1, said wall comprising a composite sheet of bullet resistant material extending continuously from the floor to the roof and between the side door posts, said sheet having peripheral edge portions extending therefrom forwardly of the body along the inner surfaces of the floor and roof and along the inner faces of the side door posts.

5. In an automobile according to claim 4, including fastenings connecting the sheet with the front seat.

6. In an automobile according to claim 4, said sheet having peripheral edge portions formed in one piece therewith and forming flanges at the ends of the wall, said wall being offset with vertically spaced portions disposed at angles to each other, the flange above and below the offset portion having separate end portions, and channel members between the separated end portions of the flanges at the ends and connected with said edge portions for securing together the flanges above and below said offset portion.

7. In an automobile according to claim 1, said wall extending behind the front seat and secured thereto for adjustment of the front seat with the shield lengthwise of the body.

8. In an automobile according to claim 1, said wall having guideways mounted thereon and opening between the guideways, a sliding door mounted in the guideways in position for covering and uncovering the opening, and means for locking the door in closed position relative thereto.

9. A robbery prevention shield adapted to be mounted in an automobile body behind the front seat thereof, comprising an upright sheet of bullet resistant material having forwardly turned flanges extending substantially continuously around the top and side edges thereof and adapted to be secured directly to a portion of the seat.

10. A robbery prevention shield according to claim 9, wherein the flange at each end has separated end portions and including channel members connected with the edge portions of the flanges at the ends for holding the flanges in place.

11. A robbery prevention shield according to claim 9, including opposed channels mounted on one face of the sheet of material, with an opening therebetween, a door having opposite edges mounted in the channels and slidably mounted therein for movement to open and close said opening, and means operatively connected with the door and one of the channels for locking the door in closed position relative to the opening.

12. A robbery prevention shield according to claim 9, wherein the sheet of material has an opening therethrough, a tray mounted in alignment with the opening and extending laterally from the sheet with upturned opposite edges, said tray having an inturned flange on at least one side thereof for limiting accessibility relative to the tray, and means mounting the tray on the sheet.

* * * * *